United States Patent

Mori et al.

[11] Patent Number: 5,872,184
[45] Date of Patent: Feb. 16, 1999

[54] THERMOPLASTIC RESIN COMPOSITION

[75] Inventors: Hiroshi Mori; Seizo Fujii, both of Otake, Japan

[73] Assignee: Mitsubishi Rayon Company Ltd., Tokyo, Japan

[21] Appl. No.: 953,535

[22] Filed: Oct. 20, 1997

Related U.S. Application Data

[63] Continuation of Ser. No. 635,237, Apr. 12, 1996, abandoned, which is a continuation of Ser. No. 234,398, Apr. 28, 1994, abandoned.

[30] Foreign Application Priority Data

Apr. 28, 1993 [JP] Japan ..................................... 5-102985

[51] Int. Cl.$^6$ .............................. C08L 55/02; C08L 83/10
[52] U.S. Cl. .............................. 525/71; 525/84; 525/105; 525/315
[58] Field of Search ................................. 525/63, 64, 71, 525/315, 105; 524/505

[56] References Cited

U.S. PATENT DOCUMENTS

| | | | |
|---|---|---|---|
| 4,533,698 | 8/1985 | Maeda et al. ............................. | 525/73 |
| 4,740,557 | 4/1988 | Nakai et al. .............................. | 525/78 |
| 4,798,867 | 1/1989 | Nakai et al. ............................. | 525/196 |
| 4,912,162 | 3/1990 | Kishida et al. ........................... | 525/67 |
| 4,994,523 | 2/1991 | Sasaki et al. ............................. | 525/63 |
| 5,064,906 | 11/1991 | Kishida et al. ......................... | 525/293 |
| 5,229,457 | 7/1993 | Kamoshita et al. ..................... | 525/71 |

FOREIGN PATENT DOCUMENTS 60-036553  2/1985  Japan.

*Primary Examiner*—Mark L. Warzel
*Attorney, Agent, or Firm*—Oblon, Spivak, McClelland, Maier & Neustadt, P.C.

[57] ABSTRACT

A resin composition, excellent in a physical property balance between chemical resistance and impact strength, obtained by mixing at least one graft copolymer selected from the group consisting of a graft copolymer in which a copolymer rubber of an alkyl acrylate and a conjugated diene is used, a graft copolymer in which a rubber prepared by seed rubber polymerizing an alkyl acrylate with a conjugated diene rubber is used and a graft copolymer in which a rubber prepared by seed rubber polymerizing an alkyl acrylate with a polyorganosiloxane rubber is used, with a graft copolymer in which a conjugated diene rubber is used, and optionally with a rigid thermoplastic resin.

8 Claims, No Drawings

THERMOPLASTIC RESIN COMPOSITION

This application is a continuation of application Ser. No. 08/635,237, filed on Apr. 12, 1996, now abandoned, which is a continuation of Ser. No. 08/234,398, filed Apr. 28, 1994, now abandoned.

BACKGROUND OF THE INVENTION

1. Field of the Invention

The present invention provides a thermoplastic resin composition excellent in chemical resistance and impact resistance and used as resin parts for home appliances, vehicles, etc., which are in an environment exposed to chemicals such as detergents and machine oil.

2. Description of the Related Art

Rubber reinforced styrene resins represented by ABS resin have been used as parts for home appliances, vehicles, etc., in a wide range of fields due to its excellent impact strength. As a result, the parts may sometimes be exposed to chemicals. For example, resin products such as wash stands and tap handles and shower heads in bath rooms are exposed to detergents; resin parts used in automobiles can be in contact with machine oil and wax removers; and resins used as handles and door caps of refrigerators can be exposed to flon chlorofluorocarbons which are foaming agents for urethane during the production of heat insulating materials for refrigerators. The resin products are often cracked, or fine cracks form on the surface thereof, under such circumstances.

The phenomenon, termed environmental stress cracking, appears when residual strain in the interior of molded rubber reinforced styrene resin products is partially released by contacting chemicals therewith, and is often observed when the resin products are contacted with chemicals having a low solubility in the resin.

There is a method for improving the chemical resistance (tendency towards environmental stress cracking) of the rubber reinforced styrene resin wherein crosslinked alkyl acrylate rubber is used as the rubber component. An example of the rubber reinforced styrene resin is AAS resin obtained by graft copolymerizing acrylonitrile and styrene with crosslinked butyl acrylate rubber. However, since AAS resin has a disadvantage that it has a low degree of impact strength, its use in resin products is markedly restricted. Though there may also be adopted means in which the rubber content is increased for obtaining a high degree of impact strength manifestation, the resultant resin products have lowered surface hardness and rigidity, and are easily scratched and deformed. Accordingly, the means is not preferable. The realization of rubber reinforced styrene resin excellent in both chemical resistance and impact strength manifestation has, therefore, been desired.

SUMMARY OF THE INVENTION

The present inventors have intensively investigated the development of a resin composition excellent in the balance of its physical properties of chemical resistance and impact strength. As a result, they have discovered that there can be obtained a thermoplastic resin composition excellent in its physical property balance by mixing essential ingredients, namely at least one graft copolymer selected from the group consisting of a graft copolymer in which a copolymer rubber of an alkyl acrylate and a conjugated diene is used, a graft copolymer in which a rubber prepared by seed rubber polymerizing an alkyl acrylate with a conjugated diene rubber is used and a graft copolymer in which a rubber prepared by seed rubber polymerizing an alkyl acrylate with a polyorganosiloxane rubber is used, and a graft copolymer in which a conjugated diene rubber is used, and an optional rigid thermoplastic resin in such a manner that the content of a rubber component in the thermoplastic resin composition falls in a specific range.

Thus, the present invention provides a thermoplastic resin composition prepared by mixing the following essential ingredients, namely a graft copolymer (I) and a graft copolymer (II), and the following optional ingredient, namely a rigid thermoplastic resin (III):

(I) a graft copolymer (I) which is at least one graft copolymer of alkyl acrylate rubber and is selected from the group consisting of the following graft copolymers (A), (B) and (C):

(A) a graft copolymer (A) prepared by graft polymerizing from 20 to 80 parts by weight of a monomer mixture comprising from 15 to 45% by weight of an unsaturated cyano compound and from 55 to 85% by weight of an aromatic vinyl compound or a monomer mixture comprising from 80 to 100% by weight of an alkyl methacrylate and from 0 to 20% by weight of an alkyl acrylate in the presence of from 20 to 80 parts by weight (as a solid component) of an agglomerated rubbery copolymer (a') latex having an average particle size of 0.15 to 0.5 μm obtained by adding an acid group containing copolymer (i) latex and an optional metal salt of oxyacid (ii) to a rubbery copolymer (a) latex which has a gel content of more than 70% by weight and an average particle size of 0.03 to 0.2 μm and which is obtained by emulsion polymerizing from 35 to 85% by weight of an alkyl acrylate, from 15 to 65% by weight of a conjugated diene and from 0 to 20% by weight of a monomer copolymerizable with these compounds, (B) a graft copolymer (B) prepared by graft polymerizing from 20 to 8 parts by weight of a monomer mixture comprising from 15 to 45% by weight of an unsaturated cyano compound and from 55 to 85% by weight of an aromatic vinyl compound in the presence of from 20 to 80 parts by weight (as solid component) of a composite rubbery polymer (b') latex which has a gel content of more than 70% by weight and is obtained by seed polymerizing from 35 to 95% by weight of a monomer mixture comprising an alkyl acrylate and a monomer copolymerizable therewith in the presence of from 5 to 65% by weight (as solid component) of a conjugated diene rubbery polymer (b) latex, and (C) a graft copolymer (C) prepared by graft polymerizing from 20 to 80 parts by weight of a monomer mixture comprising from 15 to 45% by weight of an unsaturated cyano compound and from 55 to 85% by weight of an aromatic vinyl compound in the presence of from 20 to 80 parts by weight (as solid component) of a composite rubbery polymer (c') latex which has a gel content of more than 70% by weight and is obtained by seed polymerizing from 35 to 95% by weight of a monomer mixture comprising an alkyl acrylate and a monomer copolymerizable therewith in the presence of from 5 to 65% by weight (as solid component) of a polyorganosiloxane rubbery polymer (c) latex;

(II) a graft copolymer (II) prepared by graft copolymerizing from 30 to 70 parts by weight of a monomer mixture comprising from 15 to 45% by weight of an unsaturated cyano compound and from 55 to 85% by weight of an aromatic vinyl compound in the presence of from 30 to 70 parts by weight (as solid component) of an agglomerated rubbery copolymer (d') latex which has an average particle size of 0.15 to 0.5 μm and is obtained by adding an acid group-containing copolymer (i) latex and an optional metal salt of oxyacid (ii) to a conjugated diene rubbery polymer (d) latex which has an average particle size of 0.03 to 0.2 μm and is obtained by emulsion polymerizing from 70 to 100% by weight of a conjugated diene and from 0 to 30% by weight of a monomer copolymerizable therewith; and (III) a rigid thermoplastic resin (III) prepared by copolymerizing at least two monomers selected from the group consisting of unsaturated cyano compounds, aromatic vinyl compounds, unsaturated esters and maleimide compounds; wherein 100% by weight of said thermoplastic resin composition contains from 15 to 30% by weight of a rubbery polymer and 100% by weight of the rubbery polymer contains from 30 to 85% by weight of alkyl acrylate units.

DESCRIPTION OF THE PREFERRED EMBODIMENTS

The present invention will be explained below more in detail.

The alkyl acrylate type rubbery copolymer (a) provided for the graft copolymer (A) is obtained by emulsion polymerizing from 35 to 85% by weight of an alkyl acrylate, from 15 to 65% by weight of a conjugated diene and from 0 to 20% by weight of a monomer copolymerizable with these compounds.

The alkyl acrylate used herein refers to an alkyl acrylate whose alkyl group has from 1 to 12 carbon atoms or an aryl acrylate having a benzene ring such as a phenyl group and a benzyl group. Preferable examples of the acrylate are n-butyl acrylate, 2-ethylhexyl acrylate, ethyl acrylate, and the like. One or at least two of these compounds may be used. Moreover, acrylic acid esters each having a functional group such as glycidyl acrylate, 2-hydroxyethyl acrylate, tetrahydrofurfuryl acrylate and dimethylaminoethyl acrylate may be used in combination with the above-mentioned compounds so long as the amount used is only up to 30% by weight.

Examples of the conjugate diene are 1,3-butadiene, isoprene, chloroprene, and the like. Among these compounds, 1,3-butadiene is preferably used.

Furthermore, examples of the monomer copolymerizable with the alkyl acrylate are polyfunctional monomers such as allyl acrylate, allyl methacrylate, divinyl benzene, ethylene glycol dimethacrylate, butylene glycol diacrylate, triallyl cyanurate, triallyl isocyanurate, trimethylolpropane triacrylate and pentaerythritol tetraacrylate, unsaturated cyano compounds such as acrylonitrile, aromatic vinyl compounds such as styrene, alkyl methacrylates such as methyl methacrylate and monofunctional monomers, for example, unsaturated carboxylic acids such as methacrylic acid. One or at least two of these compounds may be used. When the amount used of the conjugated diene is small, at least one of the polyfunctional monomers is usually used.

In view of the property balance between the impact strength manifestation and the chemical resistance, the content of the alkyl acrylate units in the alkyl acrylate rubbery copolymer (a) is defined to be from 35 to 85% by weight. The content of less than 35% is not preferable because the resin composition comes to have poor chemical resistance. Moreover, since the resin composition having the content exceeding 85% by weight exhibits impaired impact strength manifestation, the content is not preferable. In view of the impact strength manifestation, the rubbery copolymer (a) is required to have a gel content exceeding 70% by weight.

The rubbery copolymer (a) has an average particle size preferably in the range from 0.03 to 0.2 μm. The rubbery copolymer (a) is agglomerated to have an average particle size in the range from 0.15 to 0.5 μm, preferably from 0.2 to 0.4 μm by adding the acid group-containing copolymer latex (i) and an optional metal salt of oxyacid (ii) thereto. A rubber having a large particle size can be stably obtained in a short period of time by the agglomerating procedure.

Although it is preferable that the rubbery copolymer (a) should all become the agglomerated rubbery copolymer (a') by the agglomerating procedure, such a change is usually rare. However, even when a small amount of unagglomerative particles (agglomerated rubbery copolymer (a)) remain, the physical properties of the resin composition according to the present invention are at such a level that almost no problem is introduced.

The acid group-containing copolymer latex (i) can be obtained by emulsion polymerizing a mixture containing from 3 to 40% by weight of at least one unsaturated acid selected from the group consisting of acrylic acid, methacrylic acid, itaconic acid, crotonic acid, maleic acid, fumaric acid, cinnamic acid, sorbic acid and p-styrenesulfonic acid, from 97 to 35% by weight of at least one alkyl acrylate whose alkyl group has from 1 to 12 carbon atoms and from 0 to 40% by weight of another monomer copolymerizable with these compounds. Among the copolymers, a typical example is a copolymer of theacrylic acid and butyl acrylate.

The metal salt of an oxyacid (ii) used in the present invention refers to at least one oxyacid salt selected from the group consisting of alkali metal salts, alkaline earth metal salts, zinc salts, nickel salts and aluminum salts of oxyacids each having an element at its center selected from elements belonging to Group IIIA to Group VIA in the second and the third period in the periodic table. Concrete examples of a metal salt of an oxyacid (ii) are sulfuric acid salts, nitric acid salts and phosphoric acid salts of metals such as potassium, sodium, magnesium, calcium, zinc and aluminum. Preferable examples are potassium sulfate, sodium sulfate and sodium phosphate. The metal salt of oxyacid (ii) is added in the form of an aqueous solution.

The addition amounts of the agglomerating agents are as described below. The acid group-containing copolymer latex (i) is added in an amount of 0.5 to 8 parts by weight (as solid component) to 100 parts by weight (as solid component) of the alkyl acrylate rubbery copolymer (a). When a metal salt of an oxyacid (ii) is used in combination, the acid group-containing copolymer latex (i) and an aqueous solution of a metal salt of an oxyacid (ii) are added in amounts of 0.5 to 5 parts by weight (as solid component) and 0.05 to 2 parts by weight (as solid component), respectively.

The agglomerated rubbery copolymer (a') latex thus obtained is successively subjected to graft polymerization. Graft polymerization is carried out by polymerizing from 20 to 80 parts by weight of a monomer mixture containing from 15 to 45% by weight of an unsaturated cyano compound and from 55 to 85% by weight of an aromatic vinyl compound or a monomer mixture containing from 80 to 100% by weight of an alkyl methacrylate and from 0 to 20% by weight of an alkyl acrylate in the presence of from 20 to 80 parts by weight (as solid component) of the agglomerated rubbery copolymer (a') latex.

The use of the monomer mixture in an amount of less than 20 parts by weight produces coarse particles in the solidification step subsequent to graft polymerization, or impairs the appearance of the resin composition, and, therefore, is not preferable. Moreover, the use thereof in an amount exceeding 80 parts by weight necessitates a large amount of an emulsifier for stably carrying out graft polymerization, resulting in the coloration of the resin composition during thermal processing, and, therefore, is not not preferable.

Examples of the unsaturated cyano compound used in graft polymerization are acrylonitrile, methacrylonitrile, ethacrylonitrile, maleonitrile, fumaronitrile, and the like. Among these compounds, acrylonitrile is preferably used.

Furthermore, examples of the aromatic vinyl compound are styrene, α-methylstyrene, o-methylstyrene, p-methylstyrene, 2,4-dimethylstyrene, p-ethylstyrene, p-tert-butylstyrene, halogenated styrenes, and the like. Among these compounds, styrene and α-methylstyrene are preferably used.

The unsaturated cyano compound is used in an amount of 15 to 45% by weight, preferably 20 to 35% by weight, and the aromatic vinyl compound is used in an amount of 55 to 85% by weight, preferably 65 to 80% by weight.

The use of the unsaturated cyano compound in an amount of less than 15% by weight is not preferable because the impact strength manifestation is deteriorated. The use thereof in an amount exceeding 45% by weight is not preferable because the moldability is impaired or thermal discoloration takes place.

The alkyl methacrylate used in graft polymerization is a methacrylic acid ester possessing a linear alkyl group having from 1 to 8 carbon atoms or cyclic alkyl group, or a phenyl group, a benzyl group, a glycidyl group, 2-hydroxyethyl group, etc. One or at least two of the esters may be used. Among the esters mentioned above, methyl methacrylate is preferable.

For the purpose of improving the thermal decomposition resistance of the resin composition of the invention during fabrication, up to 20% by weight of the alkyl methacrylate in an amount of 100% by weight is preferably replaced with an alkyl acrylate.

Preferable examples of the alkyl acrylate used herein are methyl acrylate or ethyl acrylate.

Conventional emulsion polymerization may be adopted for graft polymerization. One of the following processes may be carried out in one step or at least two steps: the monomers are batch-wise charged, and polymerized; part of the monomers are charged at first, and the remainder is dropwise added; the entire monomers are dropwise added, and polymerization is freely carried out. The processes may also be carried out while the types and the compositions of the monomers are altered at each of the steps when the number of the steps are at least two. The graft copolymer latex thus obtained is solidified by a known method, and obtained as the graft copolymer (A) through steps such as dehydration, washing and drying.

The composite rubbery polymer (b') latex provided for the graft copolymer (B) is obtained by seed polymerizing from 35 to 95% by weight of a monomer mixture containing an alkyl acrylate and a monomer copolymerizable therewith in the presence of from 5 to 65% by weight (as solid component) of the conjugated diene rubbery polymer (b) latex.

When the amount of the conjugated diene rubbery polymer (b) falls outside the range mentioned above, the impact strength manifestation or chemical resistance of the resin composition is deteriorated. Accordingly, its use in such an amount is not preferable.

The conjugated diene rubbery polymer (b) used herein is a copolymer prepared from at least 50% by weight of a conjugated diene and up to 50% by weight of a monomer copolymerizable therewith. Typical examples of the conjugated diene are 1,3-butadiene, isoprene and chloroprene. Typical examples of the copolymerizable monomer are unsaturated cyano compounds such as acrylonitrile and aromatic vinyl compounds such as styrene. Preferable examples of the conjugated diene rubbery polymer are polybutadiene, acrylonitrile-butadiene copolymer rubber, styrene-butadiene copolymer rubber, and the like. Among these substances, polybutadiene is most preferable. These substances are obtained by emulsion polymerization.

The conjugated diene rubbery polymer (b) latex is preferably in large particles having an average particle size of 0.2 to 1.0 μm. Although such a rubber in large particles obtained by seed polymerization at a low rate through steps over a sufficient period of time is satisfactory, the one obtained by an agglomerating procedure is preferable. That is, the conjugated diene rubbery polymer (b) can be stably and efficiently obtained by adding the acid group-containing copolymer latex (i) and the optional metal salt of oxyacid used in the graft copolymer (A) to a base rubber latex having a particle size of 0.03 to 0.15 μm. To obtain such an agglomerated rubber having a large particle size as illustrated above, it is necessary that the pH of the base rubber latex should be set to at least at 9, and that an acid radical-containing copolymer latex having a high unsaturated acid content should be used. It is rare that all the base rubber becomes an agglomerated rubber by an agglomerating procedure, and some unagglomerated base rubber usually remains to a certain degree. Accordingly, the resultant agglomerated rubber comes to have particle size distributions in two variances. The preferable average particle size of the conjugated diene rubber is from 0.2 to 1.0 μm. However, when attention is given only to the portion of the agglomerated rubber having a large particle size and not to the unagglomerative base rubber portion, the average particle size is preferably from 0.4 to 1.2 μm.

The composite rubbery polymer (b') latex is obtained by seed polymerizing a monomer mixture containing an alkyl acrylate and a monomer copolymerizable therewith in the presence of the conjugated diene rubbery polymer (b) latex.

Examples of the alkyl acrylate are acrylates similar to those used in the graft copolymer (A). Examples of the monomer copolymerizable with the alkyl acrylate are monofunctional monomers such as acrylonitrile, styrene, n-hexyl methacrylate, 2-ethylhexyl methacrylate and n-lauryl methacrylate and polyfunctional monomers such as those crosslinking agents and graft crosslinking agents which will be shown below. Among these compounds, a crosslinking agent and a graft crosslinking agent are preferably used in combination in view of the impact strength manifestation.

Examples of the crosslinking agent are ethylene glycol dimethacrylate, propylene glycol dimethacrylate, 1,3-butylene glycol dimethacrylate, 1,4-butylene glycol dimethacrylate, and the like. Examples of the graft crosslinking agent are allyl methacrylate, triallyl cyanurate, triallyl isocyanurate, and the like. These crosslinking agents and graft crosslinking agents may be used singly or as a mixture of at least two of them.

The crosslinking agent and the graft crosslinking agent are used preferably in a total amount of 0.01 to 10% by weight based on the monomer mixture containing the alkyl acrylate as a main component. The monofunctional monomer is used preferably in an amount of 0 to 30% by weight.

A typical example of the monomer mixture used in seed polymerization is a mixture (total amount: 100% by weight) containing from 95 to 99.95% by weight of an alkyl acrylate typically represented by butyl acrylate, from 0.02 to 4.97% by weight of a crosslinking agent and from 0.03 to 4.98% by weight of a graft crosslinking agent.

Moreover, it is necessary that the composite rubbery polymer (b') should have a gel content exceeding 70% by weight in view of the impact strength manifestation.

Examples of the method for seed polymerizing a monomer mixture containing the alkyl acrylate as a main component in the presence of the conjugated diene rubbery polymer (b) are as follows: a method wherein polymerization is freely carried out while the monomer mixture is dropwise added; a method wherein a base rubbery polymer is impregnated with the monomer mixture in advance, and polymerization is carried out by adding a polymerization initiator, etc.; a method wherein the procedure of carrying out polymerization after impregnating a base rubbery polymer with the monomer mixture is successively repeated in several steps while the composition of the monomer mixture is altered from step to step; and the like method. Among these methods, the method wherein a base rubbery polymer is impregnated with the monomer mixture in advance, and polymerization is subsequently carried out, is preferable. Furthermore, an emulsifier may be newly added during seed polymerization for the purpose of improving the polymerization stability. However, it should be added preferably in a minimum possible amount.

As a result of seed polymerization, the conjugated diene rubbery polymer (b) to become a core is not seeded in some cases, and a rubbery polymer consisting only of units derived from a monomer mixture containing an alkyl acrylate as its main component is by-produced. The resultant thermoplastic resin composition has no obstacle with regard to the aimed properties of the invention. However, when the amount increases, there is a fear that the appearance of molded articles obtained therefrom may be impaired. Accordingly, it is preferable that the formation of the by-produced rubbery polymer composed only of units derived from the monomer mixture containing the alkyl acrylate as a main component should be limited to us small an amount as possible.

The composite rubbery polymer (b') latex thus obtained is successively provided for graft polymerization. Graft polymerization is carried out by graft polymerizing from 20 to 80 parts by weight of a monomer mixture containing from 15 to 45% by weight of an unsaturated cyano compound and from 55 to 85% by weight of an aromatic vinyl compound in the presence of from 20 to 80 parts by weight (as solid component) of the composite rubbery polymer (b') latex.

The types and amounts of the unsaturated cyano compound and the aromatic vinyl compound which are monomers to be used in graft polymerization and the method of graft polymerization are similar to those in the graft copolymer (A). The latex thus obtained is subjected to steps such as solidification, dehydration, washing and drying to obtain the graft copolymer (B).

On the other hand, the polyorganosiloxane rubbery polymer (c) is a rubbery polymer prepared from an organosiloxane, a crosslinking agent and an optional graft crosslinking agent. Examples of the organosiloxane are various cyclic compounds each having an at least 3-membered ring, preferably a 3- to 6-membered ring. Concrete examples thereof are hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, octaphenylcyclotetrasiloxane, and the like. These compounds may be used singly or as a mixture of at least two of them.

Examples of the crosslinking agent are trifunctional or tetrafunctional silane type crosslinking agents such as trimethoxymethylsilane, triethoxyphenylsilane, tetramethoxysilane, tetraethoxysilane, tetra-n-propoxysilane and tetrabutoxysilane. Tetrafunctional crosslinking agents are particularly preferable, and tetraethoxysilane is particularly preferable among them. The amount to be used of the crosslinking agent is from 0.1 to 30% by weight based on the polyorganosiloxane rubbery polymer (c).

There can be used as a graft crosslinking agent a compound or another substance capable of forming a unit represented by the formula

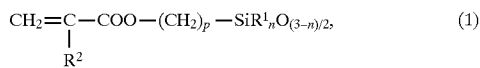

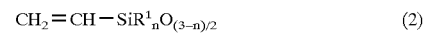

or

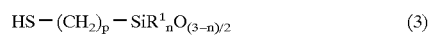

wherein $R^1$ is a methyl group, an ethyl group, a propyl group or phenyl group, $R^2$ is a hydrogen atom or methyl group, n is 0, 1 or 2, and p is an integer of 1 to 6. Since (meth) acryloyloxysiloxane capable of forming a unit of the formula (1) exhibits a high grafting efficiency, it may form effective graft chains, and is advantageous to the impact resistance manifestation. In addition, methacryloyloxysiloxane is particularly preferable as a compound capable of forming the unit of the formula (1). Concrete examples of the methacryloyloxysiloxane are β-methacryloyloxyethyl-dimethoxymethylsilane, γ-methacryloyloxypropylmethoxy-dimethylsilane, γ-methacryloyloxypropyldimethoxymethylsilane, γ-methacryloyloxypropyltrimthoxysilane, γ-methacryloyloxy-propylethoxydiethylsilane, γ-methacryloyloxypropyldiethoxy-methylsilane, δ-methacryloyloxybutyldiethoxymethylsilane, and the like. The graft crosslinking agent is used in an amount of 0 to 10% by weight based on the polyorganosiloxane rubbery polymer (c).

The polyorganosiloxane rubbery polymer (c) latex has an average particle size preferably in the range from 0.08 to 0.6 μm. When the average particle size becomes less than 0.08 μm, the molded articles obtained from the resin composition exhibit deteriorated impact resistance. Moreover, when the average particle size exceeds 0.6 μm, the molded articles obtained therefrom exhibit poor surface appearance as well as deteriorated impact resistance. Accordingly, the average particle size ranges as mentioned above are not preferable.

Though the polyorganosiloxane rubbery polymer (c) latex can be produced, for example, by processes disclosed in U.S. Pat. Nos 2,891,920 and 3,294,725, it is preferably produced by shear mixing a mixture solution of the organosiloxane, the crosslinking agent and the optional graft crosslinking agent with water in the presence of a sulfonic acid type emulsifier such as an alkylbenzenesulfonic acid or alkylsulfonic acid using a homogenizer, etc. The alkylbenzenesulfonic acid is appropriate because it acts as an emulsifier of the organosiloxane and a polymerization initiator at the same time. The use of a metal salt of an alkylbenzenesulfonic acid, a metal salt of an alkyl sulfonic acid, etc., in combination during polymerization is effective in stably maintaining the polymer during graft polymerization, and, therefore, is preferable.

The polyorganosiloxane rubbery polymer (c) latex is neutralized by adding an aqueous solution of an alkaline substance such as sodium hydroxide, potassium hydroxide or sodium carbonate, and subsequently used in seed polymerizing monomers containing the alkyl acrylate as a main component.

The composite rubbery polymer (c') latex is obtained by seed polymerizing from 35 to 95% by weight of a monomer mixture containing an alkyl acrylate and a monomer copolymerizable therewith in the presence of from 5 to 65% by weight (as solid component) of the polyorganosiloxane rubbery polymer (c) latex.

The types and amounts of the alkyl acrylate and the monomer copolymerizable therewith used in seed polymerization, and the method of seed polymerization are similar to those described in the explanation of the graft copolymer (B).

The composite rubbery polymer (c') has a gel content preferably exceeding 70% by weight in view of the impact strength manifestation.

The composite rubbery polymer (c') latex thus obtained is successively used in graft polymerization. Graft polymerization is carried out by graft polymerizing from 20 to 80 parts by weight of a monomer mixture containing from 15 to 45% by weight of an unsaturated cyano compound and from 55 to 85% by weight of an aromatic vinyl compound in the presence of from 20 to 80 parts by weight of the composite rubbery polymer (c') latex.

The types and amounts of the unsaturated cyano compound and the aromatic vinyl compound which are monomers used in graft polymerization, and the method for graft polymerization are similar to those in the graft copolymer (A). The latex thus obtained is subjected to steps such as solidification, dehydration, washing and drying to obtain the graft copolymer (C).

The conjugated diene rubbery copolymer (d) latex provided for the graft copolymer (II) is obtained by emulsion polymerizing from 70 to 100% by weight of a conjugated diene and from 0 to 30% by weight of a monomer copolymerizable therewith.

Typical examples of the conjugated diene used herein are 1,3-butadiene, isoprene and chloroprene. The conjugated diene is used in an amount of at least 70% by weight in view of the impact strength manifestation.

Examples of the monomer copolymerizable with the conjugated diene are unsaturated cyano compounds such as acrylonitrile, aromatic vinyl compounds such as styrene, alkyl methacrylates such as methyl methacrylate, unsaturated carboxylic acids such as methacrylic acid, and the like monomers. These compounds may be used singly or as a mixture of at least two of them.

Preferable examples of the conjugated diene rubbery polymer (d) are a polybutadiene rubber, an acrylonitrile-butadiene copolymer rubber and a styrene-butadiene copolymer rubber.

The conjugated diene rubbery copolymer (d) latex has an average particle size preferably in the range from 0.03 to 0.2 μm. The conjugated diene rubbery copolymer (d) latex is agglomerated to have a particle size in the range from 0.15 to 0.5 μm, preferably from 0.2 to 0.4 μm by adding the acid radical-containing copolymer latex (i) and an optional metal salt of an oxyacid (ii) whose types and amounts have been illustrated in the explanation of the graft copolymer (A). The agglomerating procedure stably produces an agglomerated rubbery copolymer (d') latex in a short period of time which has a large particle size and has a suitable impact strength.

The agglomerated rubbery copolymer (d') latex is successively used for graft polymerization. Graft polymerization is carried out by graft polymerizing from 20 to 80 parts by weight of at least one monomer selected from the group consisting of unsaturated cyano compounds, aromatic vinyl compounds and unsaturated esters in the presence of from 20 to 80 parts by weight (as solid component) of the agglomerated rubbery copolymer (d') latex.

Preferable examples of the monomer used for graft polymerization are those described in the explanation of the graft copolymer (A). Any of known emulsion polymerization methods may be adopted for the method of graft polymerization, similarly to the case of the graft copolymer (A). The graft copolymer latex thus obtained is solidified by a known method, subjected to steps such as dehydration, washing and drying to obtain the graft copolymer (II).

The rigid thermoplastic resin (III) used in the present invention is obtained by copolymerizing at least two types of monomers selected from the group consisting of unsaturated cyano compounds, aromatic vinyl compounds, unsaturated esters and maleimide compounds.

Typical examples of the unsaturated cyano compounds herein are acrylonitrile, methacrylonitrile, ethacrylonitrile, maleonitrile, fumaronitrile, and the like. Among these compounds, acrylonitrile is a preferable example. Examples of the aromatic vinyl compounds are styrene, α-methylstyrene, o-methylstyrene, p-methylstyrene, p-ethylstyrene, p-tert-butylstyrene, 2,4-dimethylstyrene, halogenated styrenes, and the like. Among these compounds, typical examples are styrene and α-methylstyrene. Examples of the unsaturated esters are methacrylic acid esters such as methyl methacrylate, ethyl methacrylate, butyl methacrylate, phenyl methacrylate, benzyl methacrylate, glycidyl methacrylate and 2-hydroxyethyl methacrylate, and the like. Among these compounds, a typical example is methyl methacrylate. Examples of the maleimide compounds are maleimide, N-alkylmaleimides each possessing a substituent alkyl group having from 1 to 12 carbon atoms, N-phenylmaleimide and its derivatives each having at least one substituent group on their benzene ring selected from the group consisting of alkyl groups of 1 to 6 carbon atoms, halogen atoms, alkoxy groups of 1 to 4 carbon atoms, a phenyl group, a carboxy group, a nitro group, an amino group and a cyano group, and the like. Among these compounds, typical examples are N-phenylmaleimide and N-cyclohexylmaleimide.

Though the rigid thermoplastic resin (III) is prepared from at least two types of monomers exemplified above, it should preferably contain at least one type of unsaturated cyano compound units. Concrete examples of the rigid thermoplastic resin (III) are acrylonitrile-styrene copolymer, acrylonitrile-α-methylstyrene copolymer, acrylonitrile-styrene-methyl methacrylate copolymer, acrylonitrile-styrene-N-phenylmaleimide copolymer, acrylonitrile-α-methylstyrene-N-phenylmaleimide copolymer, and the like. More concrete and preferable examples thereof are the following copolymers: a copolymer containing from 20 to 45% by weight, preferably from 25 to 40% by weight of acrylonitrile units, and from 55 to 80% by weight, preferably from 60 to 75% by weight of styrene units or α-methylstyrene units; a copolymer containing from 10 to 40% by weight of acrylonitrile units, from 30 to 50% by weight of styrene units and from 30 to 50% by weight of methyl methacrylate units (total amount: 100% by weight);

and a copolymer containing from 10 to 40% by weight of acrylonitrile units, from 40 to 80% by weight of styrene units and from 5 to 40% by weight of N-phenylmaleimide units or N-cyclohexylmaleimide units.

One or at least two of the rigid thermoplastic resins (III) in combination may be used. Though there is no specific limitation on the process for producing the rigid thermoplastic resin (III), it is preferable to adopt a process by which there can be obtained the resin (III) best realizing its properties The thermoplastic resin composition of the present invention is obtained by mixing essential ingredients of the graft copolymer (I) which is at least one graft copolymer selected from the group consisting of the graft copolymers (A), (B) and (C) and the graft copolymer (II) and an optional ingredient of the rigid thermoplastic resin (III). The graft copolymer (I) is essential for the purpose of realizing the chemical resistance of the resin composition. The graft copolymer (II) is essential in respect to the impact strength thereof.

The mixing ratio of the graft copolymer (I) to the graft copolymer (II) to the rigid thermoplastic resin (III) is determined so that the rubbery polymer content of the thermoplastic resin composition falls in a preferable range. That is, the mixing ratio is as follows: the rubbery polymer content in 100% by weight of the thermoplastic resin composition is from 15 to 30% by weight, preferably from 20 to 28% by weight, and the content of the alkyl acrylate units in 100% by weight of the rubbery polymer is from 30 to 85% by weight.

Since the impact strength and the chemical resistance of the thermoplastic resin composition become poor when the content of the rubbery polymer therein becomes less than 15% by weight, that content range is not preferable. Moreover, when the content exceeds 30% by weight, the surface hardness and the rigidity fall and, as a result, the application thereof is restricted and this content range is not preferable. Furthermore, when the content of the alkyl acrylate units in the rubbery polymer becomes less than 30% by weight, the chemical resistance thereof becomes poor. When the content exceeds 85% by weight, the impact strength thereof becomes poor. Accordingly, the content ranges mentioned above are not preferable.

There may be obtained thermoplastic resin compositions which satisfy the rubbery polymer content in specific resin compositions and the content of the alkyl acrylate units in the rubbery polymer according to the present invention from resin compositions containing only the graft copolymer (I), or the graft copolymer (I) and the rigid thermoplastic resin (III). However, though these thermoplastic resin compositions have excellent chemical resistance, their impact strength manifestation becomes somewhat poor. As a result, their applications are restricted. To obtain a thermoplastic resin composition exhibiting excellent impact strength manifestation, the content of the rubbery polymer used must be increased. The content increase is not preferable in respect to the surface hardness and the rigidity of the resin composition as described above. Accordingly, to obtain the resin composition exhibiting excellent impact strength manifestation, the incorporation of the graft copolymer (II) becomes essential. To obtain sufficiently the effect of incorporating the graft copolymer (II) thereinto, it is incorporated preferably in an amount of at least 5 parts by weight.

The graft copolymer (I), the graft copolymer (II) and the rigid thermoplastic resin (III) are mixed usually by a twin-cylinder blender, a Henschel mixer, or the like apparatus. During mixing, there may also be optionally added additives such as various stabilizing agents, lubricants, plasticizers, releasing agents, dyes, pigments, inorganic fillers, fine metal particles and antistatics. The resultant mixture is melt kneaded by a screw extruder, a mixing roll, or the like apparatus, and pelletized by a pelletizer.

EXAMPLES

The present invention will be illustrated more in detail below by making reference to examples, but it should be construed that the invention is in no way limited to those examples. In addition, "parts" in the examples and comparative examples refers to parts by weight. Moreover, the average particle size of rubbery polymer latex was obtained by fixing the rubbery polymer latex with osmium tetraoxide, etc., photographing it using a transmission electron microscope, and measuring the image. Furthermore, its gel content was obtained by the procedure as described below.

A dried rubbery polymer was immersed in toluene at 30° C. for 24 hours, and filtered through a screen of 200 mesh. The residue on the screen was dried, and the weight ratio of the gel thus obtained to the initially dried rubbery polymer was obtained. Synthesis of alkyl acrylate rubbery copolymer (a-1)

| | |
|---|---|
| n-Butyl acrylate | 50 parts |
| 1,3-Butadiene | 50 parts |
| Diisopropylbenzene hydroperoxide | 0.2 part |
| tert-Dodecylmercaptan | 0.4 part |
| Potassium oleate | 1 part |
| Sodium salt of N-lauroylsarcosine | 1 part |
| Rongalite | 0.5 part |
| Distilled water | 195 parts |

In the composition mentioned above, all the substances except for 1,3-butadiene were purged of oxygen gas with nitrogen. The subsequent reaction, therefore, was not substantially retarded by oxygen gas. All the substances mentioned above were charged into a 50-liter autoclave and heated to 55° C. with drastic stirring, and the mixture mentioned below was added. Polymerization was carried out at 55° C. for 8 hours to obtain an alkyl acrylate rubbery copolymer (a-1) latex having a particle size of 0.07 μm at a monomer conversion rate of 98%. Its gel content was measured, and found to be 82% by weight.

| | |
|---|---|
| Ethylenediaminetetraacetic acid disodium salt.dihydrate | 0.012 part |
| Ferrous sulfate.heptahydrate | 0.004 part |
| Distilled water | 5 parts |

Synthesis of alkyl acrylate rubbery copolymer (a-2)

| | |
|---|---|
| n-Butyl acrylate | 99 parts |
| Allyl methacrylate | 0.8 part |
| Divinyl benzene | 0.2 part |
| Diisopropylbenzene hydroperoxide | 0.02 part |
| Potassium oleate | 1.2 part |
| Sodium salt of N-lauroylsarcosine | 0.8 part |
| Rongalite | 0.4 part |
| Distilled water | 198 parts |

The composition mentioned above was charged into a 50-liter polymerization vessel. The oxygen gas within the vessel was completely replaced with nitrogen, and the contents were heated to 50° C. The mixture as described below was then added. Polymerization was carried out at 50° C. for 5 hours to obtain an alkyl acrylate rubbery copolymer (a-2) latex having a particle size of 0.14 μm and a gel content of 78% by weight at a monomer conversion of 98%.

| | |
|---|---|
| Ethylenediaminetetraacetic acid disodium salt.dihydrate | 0.000015 part |
| Ferrous sulfate.heptahydrate | 0.000005 part |
| Distilled water | 2 parts |

Synthesis of conjugated diene rubbery copolymer (d-1)

| | |
|---|---|
| 1,3-Butadiene | 100 parts |
| Diisopropylbenzene hydroperoxide | 0.2 part |
| tert-Dodecylmercaptan | 0.5 part |
| Potassium oleate | 1 part |
| Disproportionated potassium rhodinate | 1 part |
| Dextrose | 0.3 part |
| Anhydrous sodium sulfate | 0.18 part |
| Sodium hydroxide | 0.02 part |
| Distilled water | 195 parts |
| and | |
| Sodium pyrophosphate.decahydrate | 0.5 part |
| Ferrous sulfate.heptahydrate | 0.005 part |
| Distilled water | 5 parts |

The composition mentioned above was subjected to polymerization for 9 hours by the same procedure as in the synthesis of the alkyl acrylate rubbery polymer (a-1). As a result, there was obtained a conjugated diene rubbery copolymer (d-1) latex having a particle size of 0.08 μm and a gel content of 80% by weight at a monomer conversion of 97%.

Synthesis of acid radical-containing copolymer (i-1) latex

| | |
|---|---|
| Potassium oleate | 2.5 parts |
| Potassium dioctyl sulfosuccinate | 2.5 parts |
| Ethylenediaminetetraacetic acid disodium salt.dihydrate | 0.012 part |
| Ferrous sulfate.heptahydrate | 0.004 part |
| Rongalite | 0.5 part |
| Distilled water | 200 parts |

The composition mentioned above was charged into a 5-liter separable flask made of glass. The oxygen gas within the system was replaced with nitrogen with stirring, and the contents were heated to 70° C. The following mixture which had been purged of oxygen gas with nitrogen was dropwise added over a period of 4 hours, and polymerization was effected.

| | |
|---|---|
| n-Butyl acrylate | 85 parts |
| Methacrylic acid | 15 parts |
| Cumene hydroperoxide | 0.5 part |

The reaction mixture was held at 70C. for 1 hour to obtain an acid radical-containing copolymer (i-1) latex at a conversion of 97%.

Synthesis of acid radical-containing copolymer (i-2)

Polymerization was carried out in the same manner as in the synthesis of the acid radical-containing copolymer (i-1) latex except that the composition of the monomer mixture to be dropwise added was altered as described below. As a result, an acid radical-containing copolymer (i-2) latex was obtained at a monomer conversion of 96%.

| | |
|---|---|
| n-Butyl acrylate | 80 parts |
| Methacrylic acid | 20 parts |
| Cumene hydroperoxide | 0.5 part |

Synthesis of graft copolymer (A-1)

Into a 20-liter separable flask was charged 50 parts (as solid component) of the rubbery copolymer (a-1) latex, and 0.4 part (as solid component) of an aqueous solution containing 10% of sodium sulfate was added with stirring. Further was added 1.3 parts (as solid component) of the acid radical-containing copolymer (i-1) latex. The contents were held for 30 minutes with stirring, and 95 parts of distilled water was added thereto. As a result, an agglomerated rubbery copolymer (a'-1) latex having an average particle size of 0.27 μm was obtained.

| | |
|---|---|
| Sodium salt of N-laurolysarcosine | 1.25 parts |
| Ethylenediaminetetraacetic acid disodium salt.dihydrate | 0.003 part |
| Ferrous sulfate.heptahydrate | 0.001 part |
| Rongerlite | 0.5 part |

The composition mentioned above was added thereto, and the contents were heated to 75° C. with stirring. Graft polymerization was carried out by dropwise adding the following monomer mixture over a period of 120 minutes.

| | |
|---|---|
| Acrylonitrile | 15 parts |
| Styrene | 35 parts |
| tert-Butylhydroperoxide | 0.3 part |
| m-Octylmercaptan | 0.1 part |

The reaction mixture was further held for 1 hour after the completion of dropwise adding the monomer mixture to obtain a graft copolymer latex. The graft copolymer latex was solidified by being added to dilute aqueous sulfuric acid, dehydrated, washed and dried to obtain a graft copolymer (A-1).

Synthesis of graft copolymer (A-2)

The procedure in the synthesis of the graft copolymer (A-1) was repeated until the agglomerated rubbery copolymer was obtained.

| | |
|---|---|
| Agglomerated rubbery copolymer (a'-1) latex (as solid component) | 60 parts |
| Sodium salt of N-lauroylsarcosine | 0.75 part |
| Ethylenediaminetetraacetic acid disodium salt.dihydrate | 0.0015 part |
| Ferrous sulfate.heptahydrate | 0.0005 part |
| Rongerlite | 0.4 part |

The composition mentioned above was charged into a 20-liter separable flask, and the contents were heated to 75° C. with stirring. Graft polymerization was carried out by adding the following monomer mixture to the contents over a period of 90 minutes.

| | |
|---|---|
| Methyl methacrylate | 36 parts |
| Ethyl acrylate | 4 parts |
| Cumene hydroperoxide | 0.15 part |
| n-Octyl mercaptan | 0.05 part |

The reaction mixture was further held for 1 hour after the completion of dropwise adding the monomer mixture to obtain a graft copolymer latex. The graft copolymer latex was solidified by being added to diluted aqueous sulfuric acid, dehydrated, washed, and dried to obtain a graft copolymer (A-2)

Synthesis of graft copolymer (A-3)

A graft copolymer (A-3) was obtained in the same manner as in the synthesis of the graft copolymer (A-1) except that the rubbery copolymer (a-2) was used as the rubbery polymer, and that the acid radical-containing copolymer (i-2) was used as an agglomerating agent used for the agglomerating procedure in place of the acid group-containing copolymer (i-1). The average particle size of the agglomerated rubbery copolymer (a'-2) was 0.31 μm.

Synthesis of composite rubbery polymer(b'-1)

Into a 20-liter separable flask was charged 20 parts (as solid component) of the rubbery polymer (d-1) latex. The acid group-containing copolymer (i-2) latex was added thereto in an amount of 0.5 part (as solid component) with stirring. The contents were held for 30 minutes, and 160 parts of distilled water was added thereto to effect the agglomerating procedure. As result, an agglomerated rubbery copolymer having an average particle size of 0.37 μm was obtained.

| n-Butyl acrylate | 79.55 parts |
|---|---|
| Allyl methacrylate | 0.3 part |
| Ethylene glycol dimethacrylate | 0.15 part |
| tert-Butyl hydroperoxide | 0.2 part |

The monomer mixture mentioned above was added thereto, and the contents were sufficiently stirred. Into the reaction system was added 0.5 part of sodium salt of N-lauroyl-sarcosine, and the system was purged of oxygen gas with nitrogen. The internal temperature was raised to 45° C., and the following composition was placed therein.

| Rongalite | 0.5 part |
|---|---|
| Ferrous sulfate.heptahydrate | 0.0003 part |
| Ethylenediaminetetraacetic acid disodium salt.dihydrate | 0.0009 part |
| Distilled water | 10 parts |

As a result, polymerization was initiated, and the internal temperature rose to about 70° C. The reaction mixture was held at 75° C. for 90 minutes with stirring to obtain a composite rubbery polymer (b'-1) latex. Its gel content was measured, and found to be 84% by weight.

Synthesis of composite rubbery Dolymer (b'-2)

The procedure of the synthesis of the composite rubbery polymer (b'-1) was repeated except that n-octyl mercaptan was added in an amount of 0.2 part to the monomer mixture to be used in seed polymerization to obtain a composite rubbery polymer (b'-2).

Its gel content was 47% by weight.

Synthesis of graft copolymer (B-1)

| Composite rubbery polymer (b'-1) latex (as solid component) | 50 parts |
|---|---|
| Sodium salt of N-lauroylsarcosine | 1.2 part |
| Rongalite | 0.4 part |
| Ferrous sulfate.heptahydrate | 0.001 part |
| Ethylenediaminetetraacetic acid disodium salt.dihydrate | 0.003 part |
| Distilled water | 100 parts |

The composition mentioned above was charged into a 20-liter separable flask, and the contents were heated to 75° C. with stirring. The monomer mixture mentioned below was dropwise added thereto over a period of 120 minutes to effect graft polymerization.

| Acrylonitrile | 15 parts |
|---|---|
| Styrene | 35 parts |
| tert-Butyl hydroperoxide | 0.3 part |
| n-Octylmercaptan | 0.1 part |

After the completion of adding the monomer mixture, the reaction mixture was held with stirring for 1 hour to obtain a graft copolymer latex. The graft copolymer latex was placed in diluted aqueous sulfuric acid to be solidified, dehydrated, washed, and dried to obtain a graft copolymer (B-1) in powder.

Synthesis of graft copolymer (B-2)

The procedure of the synthesis of the graft copolymer (B-1) was repeated except that the composite rubbery polymer (b'-2) was used in place of the composite rubbery polymer (b'-1) to obtain a graft copolymer (B-2).

Synthesis of composite rubbery polymer (c'-1)

| Dodecylbenzenesulfonic acid | 1 part |
|---|---|
| Sodium dodecylbenzenesulfonate | 1 part |
| Distilled water | 200 parts |

A siloxane mixture having the composition mentioned below was added to the composition mentioned above, premixed by a homomixer at 10,000 rpm, and emulsified and dispersed by a homogenizer at a pressure of 300 kg/cm$^2$ to obtain an organosiloxane latex.

| Tetraethoxysilane | 1.0 part |
|---|---|
| γ-Methacryloyloxypropyldimethoxymethylsilane | 0.25 part |
| Octamethylcyclotetrasiloxane | 48.75 parts |

The mixture solution was transferred to a 20-liter separable flask, heated at 80° C. for 5 hours with stirring, and allowed to stand at 20° C. for 48 hours. The latex was neutralized to a pH of 7.5 with an aqueous solution of sodium hydroxide to obtain a polyorganosiloxane rubbery polymer (c-1) latex having an average particle size of 0.16 μm. To the latex was added 70 parts of distilled water, and the following monomer mixture was added to the contents with stirring to be satisfactorily mixed.

| n-Butyl acrylate | 48.6 parts |
|---|---|
| Allyl methacrylate | 1.05 parts |
| Ethylene glycol dimethacrylate | 0.35 part |
| tert-Butyl hydroperoxide | 0.3 part |

The system was purged of oxygen gas with nitrogen, and the internal temperature was raised to 50° C. The following mixture was added to the system, and polymerization was thus initiated.

| Rongalite | 0.3 part |
|---|---|
| Ferrous sulfate.heptahydrate | 0.002 part |
| Ethylenediaminetetraacetic acid disodium salt dihydrate | 0.006 part |
| Distilled water | 10 parts |

As a result, the internal temperature rose to about 65° C., and then the reaction mixture was held at 70° C. for 2 hours to obtain a composite rubbery polymer (c'-1) latex. The gel content was measured, and found to be 95% by weight.

Synthesis of composite rubbery polymer (c'-2)

The procedure of the synthesis of the composite rubbery polymer (c'-1) was repeated except that the monomer mixture mentioned below for seed polymerization was used to obtain a composite rubbery polymer (c'-2). The gel content was measured, and found to be 63% by weight.

| n-Butyl acrylate | 49.7 parts |
|---|---|
| Allyl methacrylate | 0.35 part |
| tert-Butyl hydroperoxide | 0.3 part |
| n-Octylmercaptan | 0.3 part |

Synthesis of graft copolymer (C-1)

| Composite rubbery polymer (c'-1) latex (as solid component) | 60 parts |
|---|---|
| Sodium dodecylbenzenesulfonate | 0.3 part |
| Distilled water | 80 parts |

The composition mentioned above was charged into a 20-liter separable flask. The contents were heated to 70° C. with stirring, and the monomer mixture mentioned below was dropwise added thereto over a period of 60 minutes to effect graft polymerization.

| Acrylonitrile | 12 parts |
|---|---|
| Styrene | 28 parts |
| Cumene hydroperoxide | 0.2 part |
| tert-Dodecylmercaptan | 0.1 part |

After the completion of dropwise adding the monomer mixture, the reaction mixture was held for 2 hours with stirring to obtain a graft copolymer latex. The graft copolymer latex was placed in an aqueous solution of calcium chloride to be solidified, dehydrated, washed, and dried to obtain a graft copolymer (C-1) in powder form.

Synthesis of graft copolymer (C-2)

The procedure of the synthesis of the graft copolymer (C-1) was repeated except that the composite rubbery polymer (c'-2) was used in place of the composite rubbery polymer (c'-1) to obtain a graft copolymer (C-2).

Synthesis of graft copolymer (D-1)

Into a 20-liter separable flask was charged 60 parts (as solid component) of the conjugated diene rubbery copolymer (d-1) latex, and 1.2 parts (as solid component) of the acid group-containing copolymer (i-1) latex was added thereto with stirring. The contents were held with stirring for 30 minutes, and 80 parts of distilled water was added thereto. As a result, an agglomerated rubbery copolymer (d'-1) latex having an average particle size of 0.28 µm was obtained.

| Disproportionated potassium rhodinate | 0.4 part |
|---|---|
| Sodium pyrophosphate.decahydrate | 0.02 part |
| Ferrous sulfate.heptahydrate | 0.005 part |
| Dextrose | 0.4 part |
| Sodium hydroxide | 0.02 part |

The composition mentioned above was added thereto, and the mixture was heated to 60° C. with stirring. The following monomer mixture was dropwise added to the mixture over a period of 120 minutes to effect graft polymerization.

| Acrylonitrile | 12 parts |
|---|---|
| Styrene | 28 parts |
| Cumene hydroperoxide | 0.2 part |
| tert-Dodecylmercaptan | 0.4 part |

After the completion of dropwise adding the monomer mixture, the reaction mixture was further held for 1 hour to obtain a graft copolymer latex. The graft copolymer latex was placed in diluted aqueous sulfuric acid to be solidified, dehydrated, washed, and dried to obtain a graft copolymer (D-1).

Synthesis of rigid thermoplastic resin (III-1)

| Acrylonitrile | 30 parts |
|---|---|
| Styrene | 70 parts |
| Azobisisobutyronitrile | 0.15 part |
| tert-Dodecylmercaptan | 0.4 part |
| Calcium phosphate | 0.5 part |
| Distilled water | 150 parts |

The composition mentioned above was charged into a 100-liter autoclave, and drastically stirred. When the dispersion within the system was confirmed, the reaction mixture was heated to 75° C., and polymerization was carried out for 3 hours. The reaction mixture was then heated to 110° C., aged for 30 minutes, cooled, dehydrated, washed, and dried to obtain a rigid thermoplastic resin (III-1) in powder form.

Synthesis of rigid thermoplastic resin (III-2)

| Acrylonitrile | 20 parts |
|---|---|
| Styrene | 40 parts |
| Methyl methacrylate | 40 parts |
| Azobisisobutyronitrile | 0.15 part |
| tert-Dodecylmercaptan | 0.2 part |
| Calcium phosphate | 0.5 part |
| Distilled water | 150 parts |

The composition mentioned above was polymerized by the same procedure as in the synthesis of the rigid thermoplastic resin (III-1) to obtain a rigid thermoplastic resin (III-2) in powder.

Synthesis of rigid thermoplastic resin (III-3)

| Potassium oleate | 3 parts |
|---|---|
| Dextrose | 0.5 part |
| Ferrous sulfate.heptahydrate | 0.005 part |
| Sodium pyrophosphate.decahydrate | 0.5 part |
| Anhydrous sodium sulfate | 0.15 part |
| Distilled water | 200 parts |
| Acrylonitrile | 10 parts |
| α-Methylstyrene | 70 parts |
| tert-Dodecylmercaptan | 0.1 part |

The composition mentioned above was charged into a 100-liter polymerization reactor lined with glass, and heated to 60° C. with stirring. Cumene hydroperoxide was added thereto in an amount of 0.5 part, and polymerization was carried out while 20 parts of acrylonitrile was dropwise added to the mixture over a period of 120 minutes. The internal temperature gradually rose to abut 80° C. during polymerization. The reaction mixture was subsequently held at 80° C. for 2 hours to obtain a copolymer latex. The copolymer latex was placed in an aqueous solution of magnesium sulfate to be solidified, dehydrated, washed, and dried to obtain a rigid thermoplastic resin (III-3) in powder form.

Synthesis of rigid thermoplastic resin (III-4)

| | |
|---|---|
| Styrene | 40 parts |
| Ethyl methyl ketone | 10 parts |

A procedure of evacuating a glass-lined 50-liter polymerization reactor of complete mixing type by a vacuum pump and introducing a nitrogen gas therewithin was repeated several times, and the mixture mentioned above was charged thereinto in a nitrogen atmosphere. The contents were heated to 100° C., and the following mixture was dropwise fed to the polymerizer over a period of 60 minutes to effect solution polymerization.

| | |
|---|---|
| Acrylonitrile | 20 parts |
| N-Phenylmaleimide | 10 parts |
| 1,1-Dibutylperoxy-3,3,5-trimethylcyclohexane | 0.07 part |
| Ethyl methyl ketone | 20 parts |

After the completion of dropwise adding the mixture, the reaction mixture was aged at 100° C. for 1 hour to decrease markedly the remaining amount of N-phenylmaleimide. A polymerization inhibitor was placed in the reaction mixture, which was then rapidly cooled. The polymerization reaction mixture was then quantitatively fed to a deaeration extruder by a gear pump, which removed remaining monomers, organic solvents, etc. The copolymer was then extruded in a strand form, and treated by a pelletizer to obtain a rigid thermoplastic resin (III-4) in pellets.

Preparation of thermoplastic resin composition

Predetermined amounts of the graft copolymer (I), the graft copolymer (II) and the rigid thermoplastic resin (III) were pladced in a Henschel mixer together with the following substances, and blend.

| | |
|---|---|
| Adeka Stab AO-20 (trade name, manufactured by Asahi Denka K.K.) | 0.3 part |
| Adeka Stab AO-412S (trade name, manufactured by Asahi Denka K.K.) | 0.3 part |
| Ethylenebisstearamide | 1 part |
| Magnesium stearate | 0.3 part |
| SH 200 (trade name of silicone oil, manufactured by Dow Corning Toray Silicone Co., Ltd.) | 0.03 part |

The mixture mentioned above was melt kneaded at a temperature of 220° to 260° C. by a screw extruder, and pelletized by a pelletizer. Various test pieces were formed by an injection molding machine or press molding machine.

The resin compositions thus obtained were evaluated by methods as described below.
(1) Izod impact strength (IZ): Measurements were made in accordance with ASTM D-256 (measured unit: kg.cm/cm).
(2) Rockwell hardness (R): Measurements were made in accordance with ASTM D-785 (R scale).
(3) Vicat softening temperature (VST): Measurements were made in accordance with ISO R-306 (measured unit: ° C.).
(4) Chemical resistance: A test piece having a size of 35×120 mm was cut out of a press molded plate 2 mm thick of the resin composition, and the test piece was attached to a jig having a shape of a quarter of ellipse (major axis: 120 mm, minor axis: 40 mm). The test piece was coated with a chemical, covered with a polyethylene film, and exposed to the chemical at 25° C. for 4 hours. For a chemical having a low boiling point, the test was carried out as described below. The test piece was placed in a desiccator having a shut-off cock together with the jig, and exposed to the chemical at 25° C. for 24 hours while the desiccator was filled with the vapor thereof. After the exposure, the surface state of the test piece was observed, and the maximum stress strain value at which no crack was formed was used as an index of the chemical resistance of the resin composition.

The following substances were used as the chemicals.

1,1-Dichloro-1-fluoroethane

Brake oil (trade name of 2400G, manufactured by Toyota Motor Corporation)

Wax remover (trade name of ST-7, manufactured by Yushiro Chemical Industry, Ltd.)

Salad oil (manufactured by Nisshin Oil Co., Ltd.)

Dioctyl phthalate

TABLE 1

| | Resin composition | | | | |
|---|---|---|---|---|---|
| | Graft copolymer (I) (parts) | Graft copolymer (II) (parts) | Rigid thermoplastic resin (III) (parts) | Content of rubbery polymer* (wt. %) | Content of alkyl acrylate units# (wt. %) |
| Ex. 1 | A-1 (44) | D-1 (10) | III-1 (46) | 28 | 39 |
| Ex. 2 | A-2 (35) | D-1 (10) | III-2 (55) | 27 | 39 |
| Ex. 3 | B-1 (30) | D-1 (15) | III-1 (55) | 24 | 50 |
| C.E. 1 | A-1 (10) | D-1 (35) | III-1 (55) | 26 | 10 |
| C.E. 2 | B-1 (70) | D-1 (10) | III-1 (20) | 41 | 68 |
| C.E. 3 | B-1 (15) | D-1 (5) | III-1 (80) | 11 | 57 |
| C.E. 4 | A-3 (44) | D-1 (10) | III-1 (46) | 28 | 79 |
| Ex. 4 | C-1 (44) | D-1 (10) | III-1 (46) | 28 | 39 |

| | Physical Properties | | | Chemical resistance (Critical strain %) | | | | |
|---|---|---|---|---|---|---|---|---|
| | Iz | R | VST | 1,1-Dichloro-1-fluoro-ethane | Brake oil | Wax remover | Salad oil | Dioctyl phthalate |
| Ex. 1 | 39 | 92 | 95 | 1.8 | 0.6 | 1.1 | 1.0 | 0.8 |
| Ex. 2 | 34 | 96 | 99 | 1.9 | 0.6 | 1.0 | 1.0 | 0.8 |
| Ex. 3 | 32 | 97 | 98 | 2.0 | 0.6 | 1.1 | 1.0 | 0.9 |
| C.E. 1 | 38 | 96 | 97 | <0.3 | <0.3 | 0.3 | 0.3 | <0.3 |
| C.E. 2 | 48 | 76 | 81 | ≧2 | 1.2 | ≧2 | ≧2 | 1.6 |
| C.E. 3 | 10 | 109 | 99 | 1.0 | 0.3 | 0.6 | 0.6 | 0.4 |
| C.E. 4 | 15 | 90 | 94 | 2.0 | 0.8 | 1.4 | 1.8 | 1.2 |
| Ex. 4 | 31 | 94 | 96 | 1.8 | 0.7 | 1.0 | 1.1 | 0.8 |

Note:
*The content in 100% by weight of the resin composition is shown after rounding the numerical value in the first decimal place is rounded.
The content of the alkyl acrylate units in 100% by weight of the rubbery polymer is shown after rounding the numerical value in the first decimal place.

TABLE 2

| | Resin composition | | | | |
|---|---|---|---|---|---|
| | Graft copolymer (I) (parts) | Graft copolymer (II) (parts) | Rigid thermoplastic resin (III) (parts) | Content of rubbery polymer* (wt. %) | Content of alkyl acrylate units# (wt. %) |
| Ex. 5 | B-1 (28) | D-1 (10) | III-1 (62) | 20 | 56 |
| Ex. 6 | C-1 (36) | D-1 (10) | III-1 (54) | 24 | 38 |
| C.E. 5 | B-2 (28) | D-1 (10) | III-1 (62) | 20 | 56 |
| C.E. 6 | C-2 (36) | D-1 (10) | III-1 (54) | 24 | 38 |

TABLE 2-continued

|  | Physical Properties | | | Chemical resistance (Critical strain %) | | | | |
|---|---|---|---|---|---|---|---|---|
|  | Iz | R | VST | 1,1-Di-chloro-1-fluoro-ethane | Brake oil | Wax remover | Salad oil | Dioctyl phthalate |
| Ex. 5 | 28 | 100 | 98 | 1.9 | 0.6 | 1.0 | 1.0 | 0.8 |
| Ex. 6 | 24 | 98 | 97 | 1.6 | 0.7 | 1.0 | 1.0 | 0.8 |
| C.E. 5 | 18 | 99 | 98 | 1.9 | 0.5 | 1.1 | 1.0 | 0.8 |
| C.E. 6 | 10 | 96 | 97 | 1.5 | 0.6 | 0.9 | 1.0 | 0.7 |

Note:
*The content in 100% by weight of the resin composition is shown after rounding the numerical value in the first decimal place is rounded.
The content of the alkyl acrylate units in 100% by weight of the rubbery polymer is shown after rounding the numerical value in the first decimal place.

TABLE 3

| Resin composition | | | | | |
|---|---|---|---|---|---|
|  | Graft copolymer (I) (parts) | Graft copolymer (II) (parts) | Rigid thermoplastic resin (III) (parts) | Content of rubbery polymer* (wt. %) | Content of alkyl acrylate units# (wt. %) |
| Ex. 1 | A-2 (40) | D-1 (5) | III-3 (55) | 27 | 44 |
| Ex. 8 | B-1 (40) | D-1 (10) | III-3 (50) | 26 | 62 |
| Ex. 9 | B-1 (40) | D-1 (10) | III-4 (50) | 26 | 62 |
| C.E. 7 | A-3 (40) | D-1 (10) | III-3 (55) | 26 | 77 |

|  | Physical Properties | | | Chemical resistance (Critical strain %) | | | | |
|---|---|---|---|---|---|---|---|---|
|  | Iz | R | VST | 1,1-Di-chloro-1-fluoro-ethane | Brake oil | Wax remover | Salad oil | Dioctyl phthalate |
| Ex. 7 | 16 | 98 | 114 | $\geq 2$ | 0.7 | 1.1 | 1.0 | 0.8 |
| Ex. 8 | 19 | 98 | 112 | $\geq 2$ | 0.7 | 1.1 | 1.1 | 0.8 |
| Ex. 9 | 18 | 99 | 113 | $\geq 2$ | 0.8 | 1.2 | 1.2 | 0.9 |
| C.E. 7 | 5 | 96 | 112 | $\geq 2$ | 0.8 | 1.2 | 1.1 | 0.8 |

Note:
*The content in 100% by weight of the resin composition is shown after rounding the numerical value in the first decimal place is rounded.
The content of the alkyl acrylate units in 100% by weight of the rubbery polymer is shown after rounding the numerical value in the first decimal place.

The following conclusions can drawn from Table 1.

Thermoplastic resin compositions excellent in both impact strength manifestation and chemical resistance can be obtained in Examples 1 to 4 according to the present invention. On the contrary, since the thermoplastic resin composition in Comparative Example 1 contains the alkyl acrylate units in a decreased amount in the rubbery polymer compared with that of the present invention, the resin composition exhibits a deteriorated chemical resistance. Since the thermoplastic resin composition in Comparative Example 2 contains an increased amount of the rubbery polymer compared with that of the invention, the resin composition exhibits a Rockwell hardness of less than 80 and has a soft surface. On the contrary, since the thermoplastic resin composition in Comparative Example 3 contains a decreased amount of the rubbery polymer compared with that of the invention, the resin composition exhibits deteriorated impact strength manifestation. In Comparative Example 4, the amounts of the rubbery polymer and the alkyl acrylate units of the thermoplastic resin conform to those defined by the invention. However, since a conventional AAS resin whose rubbery polymer is a simple butyl acrylate rubber is used therein, the resin composition exhibits deteriorated impact strength.

Furthermore, it can be concluded from Table 2 that since the graft copolymers (I) of the thermoplastic resin compositions in Comparative Examples 5 and 6 contain a composite rubbery polymer having a low gel content, the resin compositions exhibit deteriorated impact strength.

Still furthermore, it can be concluded from Table 3 that even when the heat-resistant rigid thermoplastic resin (III) is used, the thermoplastic resin composition of the invention in which the graft copolymer (I) is used exhibits a high impact strength compared with the resin composition in Comparative Example 7 in which an AAS resin is used.

The present invention provides a thermoplastic resin composition which is prepared by mixing a graft copolymer obtained by graft polymerizing a monomer mixture with an alkyl acrylate rubber, a graft copolymer obtained by graft polymerizing a monomer mixture with a conjugated diene rubber and a rigid thermoplastic resin in an optimum proportion. The thermoplastic resin composition is extremely excellent in chemical resistance and impact resistance. Accordingly, the thermoplastic resin composition of the present invention is extremely useful as parts for electrical appliances and vehicles which are contacted with urethane foaming agents, various oils, detergents, etc.

We claim:

1. A thermoplastic resin composition prepared by mixing a graft copolymer (I) and a graft copolymer (II). and optionally a rigid thermoplastic resin (III):
wherein:
(I) a graft copolymer (I) is at least one graft copolymer of alkyl acrylate rubber and is a graft copolymer (C) prepared by graft polymerizing from 20 to 80 parts by weight of a monomer mixture comprising from 15 to 45% by weight of an unsaturated cyano compound and from 55 to by 85% by weight of an aromatic vinyl compound in the presence of from 20 to 80 parts by weight (as solid component) of a composite rubbery polymer (c') latex which has a gel content of more than 70% by weight and is obtained by seed polymerizing from 35 to 95% by weight of a monomer mixture comprising an alkyl acrylate and a monomer copolymerizable therewith in the presence of from 5 to 65% by weight (as solid component) of a polyorganosiloxane rubbery polymer (c) latex;
(II) graft polymer (II) is prepared by graft polymerizing from 30 to 70 parts by weight of a monomer mixture comprising from 15 to 45% by weight of an unsaturated cyano compound and from 55 to 85% by weight of an aromatic vinyl compound in the presence of from 30 to 70 parts by weight (as solid component) of an agglomerate rubbery copolymer (d') latex which has an average particle size of 0.15 to 0.5 microns and is obtained by adding an acid group-containing copolymer (i) latex and an optional metal salt of an oxy acid (ii) to a conjugated diene rubbery polymer (d) latex which has an average particle size of 0.03 to 0.2 $\mu$m and is obtained by emulsion polymerizing from 70 to 100% by weight of a conjugated diene and from 0 to 30% by weight of a monomer copolymerizable therewith, and
(III) rigid thermoplastic resin (III) is prepared by copolymerizing at least two monomers selected from the group consisting of unsaturated cyano compounds aromatic vinyl compounds, unsaturated esters and maleimide compounds; wherein 100% by weight of said thermoplastic resin composition contains from 15 to 30% by weight of a rubbery polymer and 100% by weight of the rubbery polymer contains from 30 to 85% by weight of alkyl acrylate units.

2. The thermoplastic resin composition according to claim 1 wherein said rigid thermoplastic resin (III) is a copolymer resin obtained by polymerizing from 20 to 45% by weight of an unsaturated cyano compound and from 55 to 80% by weight of an aromatic vinyl compound.

3. The thermoplastic resin composition according to claim 1 wherein said rigid thermoplastic resin (III) is a copolymer resin obtained by polymerizing from 25 to 40% by weight of an unsaturated cyano compound and from 60 to 75% by weight of an aromatic vinyl compound.

4. The thermoplastic resin composition according to claim 1 wherein said rigid thermoplastic resin (III) is a copolymer resin obtained by polymerizing from 10 to 40% by weight of an unsaturated cyano compound, from 30 to 50% by weight of an aromatic vinyl compound and from 30 to 50% by weight of an alkyl methacrylate (total amount: 100% by weight).

5. The thermoplastic resin composition according to claim 1 wherein said rigid thermoplastic resin (III) is a copolymer resin obtained by copolymerizing from 10 to 40% by weight of an unsaturated cyano compound, from 40 to 80% by weight of an aromatic vinyl compound and from 5 to 40% by weight of a maleimide compound (total amount: 100% by weight).

6. The thermoplastic resin composition according to claim 1 wherein said graft copolymer (C) is a graft copolymer obtained by using a monomer mixture in graft polymerization comprising from 20 to 35% by weight of an unsaturated cyano compound and from 65 to 80% by weight of an aromatic vinyl compound.

7. The thermoplastic resin composition according to claim 1 wherein said graft copolymer (II) is a graft copolymer obtained by using a monomer mixture in graft polymerization comprising from 20 to 35% by weight of an unsaturated cyano compound and from 65 to 80% by weight of an aromatic vinyl compound.

8. The thermoplastic resin composition according to claim 1 wherein said graft copolymer (C) is obtained by seed polymerizing a monomer mixture comprising from 95 to 99.95% by weight of an alkyl acrylate and from 0.05 to 5% by weight of a crosslinking agent and a graft crosslinking agent with the polyorganosiloxane rubbery polymer (c) latex.

* * * * *